United States Patent [19]

Hurley

[11] Patent Number: 5,536,031
[45] Date of Patent: Jul. 16, 1996

[54] FIFTH WHEEL COVER

[76] Inventor: Rodney H. Hurley, P.O. Box 5962, Napa, Calif. 94581

[21] Appl. No.: 395,075

[22] Filed: Feb. 27, 1995

[51] Int. Cl.⁶ .................................................. B60D 1/60
[52] U.S. Cl. ................................. 280/507; 280/433
[58] Field of Search .................................. 280/432, 433, 280/504, 507; 384/421

[56] References Cited

U.S. PATENT DOCUMENTS 4,169,635  10/1979  Szalay et al. .................. 280/433 X
5,058,914  10/1991  Murcheson ........................ 280/433
5,165,713  11/1992  Picard ............................. 280/433

*Primary Examiner*—Kevin T. Hurley
*Attorney, Agent, or Firm*—Deanna J. Shirley; Ropers, Majeski, Kohn & Bentley

[57] ABSTRACT

An ornamental cover for a fifth wheel hitch plate for use when the hitch is not engaged. The hitch plate cover comprises principal and tail portions and a kingpin shaft and locking washer for locking the hitch plate cover in place after the trailer has been removed from the fifth wheel hitch. The cover is further stabilized with a kingpin guide tab and moldings covering the edges of the cover.

4 Claims, 3 Drawing Sheets

FIFTH WHEEL COVER

FIELD OF THE INVENTION

This invention relates to a fifth wheel hitch cover. In particular, it relates to an ornamental cover to be placed over a fifth wheel hitch plate and kingpin opening when the hitch is not in use.

BACKGROUND OF THE INVENTION

A fifth wheel hitch is a type used to hitch a recreational or other trailer to a pick-up truck or other vehicle. A fifth wheel hitch comprises a hitch plate or bearing plate which is presented in a horizontal position. The bearing plate comprises flanges which slope downwardly and toward the rear of the truck. A central kingpin opening on the bearing plate receives a kingpin which extends downwardly from the trailer which is to be hitched. When the trailer is not hitched to the fifth wheel, the kingpin opening and bearing plate are unsightly and show signs of use and rust. It is the object of this invention to provide an ornamental cover for the kingpin opening and other parts of the hitch when the hitch is not in use.

SUMMARY OF THE INVENTION

According to the invention there is provided a fifth wheel cover comprising a principal portion or member having top and bottom sides, a tail portion extending from the principal portion of suitable contour to cover the sloped flanges of a fifth wheel hitch plate, a simulated kingpin shaft extending downwardly from the bottom side of the cover able to engage the hitch, and a locking washer for securing the engaged simulated king pin shaft to the hitch. A guide tab also extending from the bottom side of the principal portion bears against the sloped flanges of the bearing plate to prevent rotational movement of the hitch plate cover when in use. Moldings can be added to the edges of the hitch plate cover for improved appearance. The cover itself can also display a decorative design on the top side of the cover.

REFERENCE NUMERALS IN DRAWING

Figure 1:
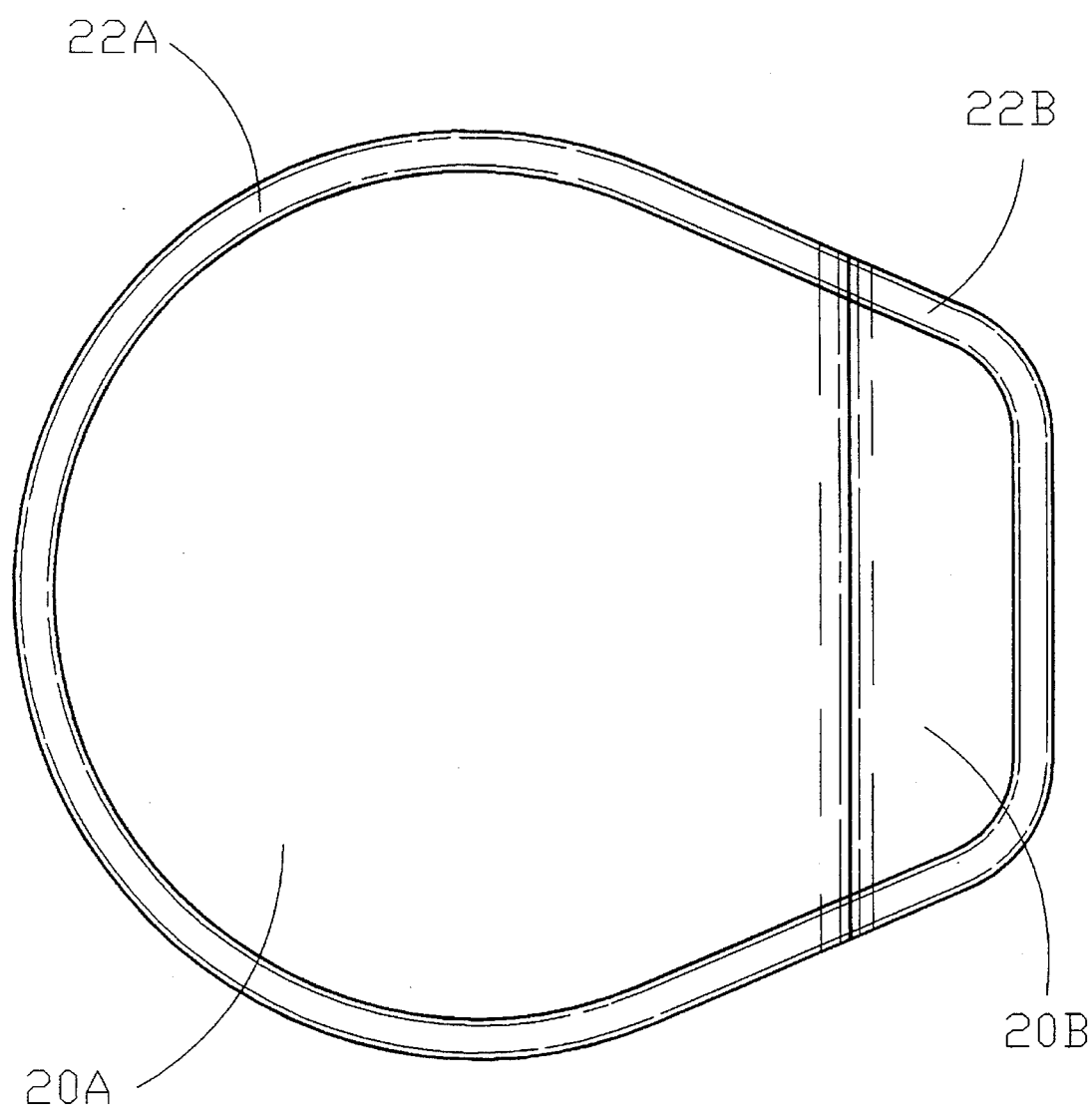
FIG. 1 is a view from the top of a fifth wheel hitch plate cover according to the invention.
Figure 2:
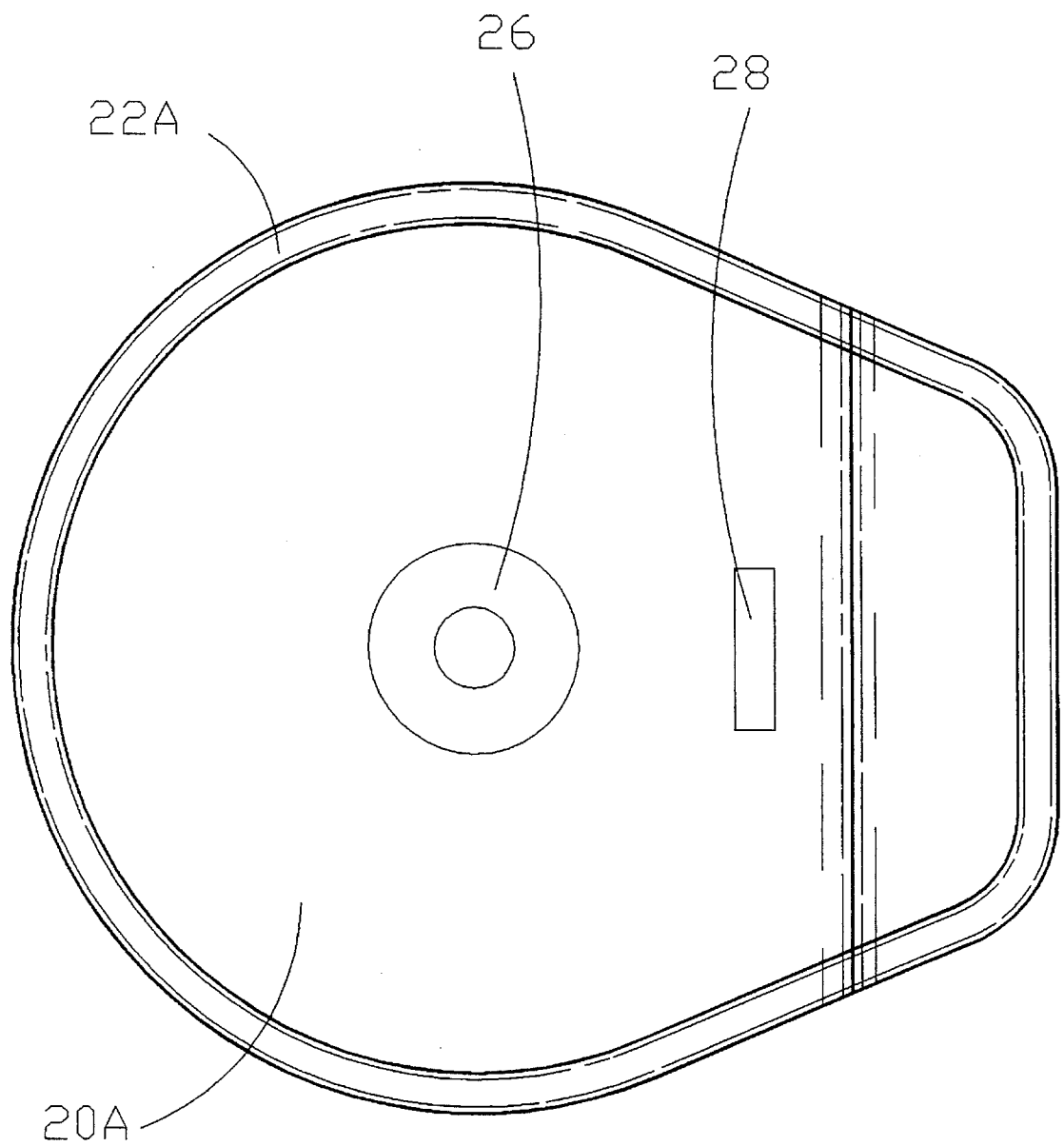
FIG. 2 is view from the bottom of the invention.
Figure 3:
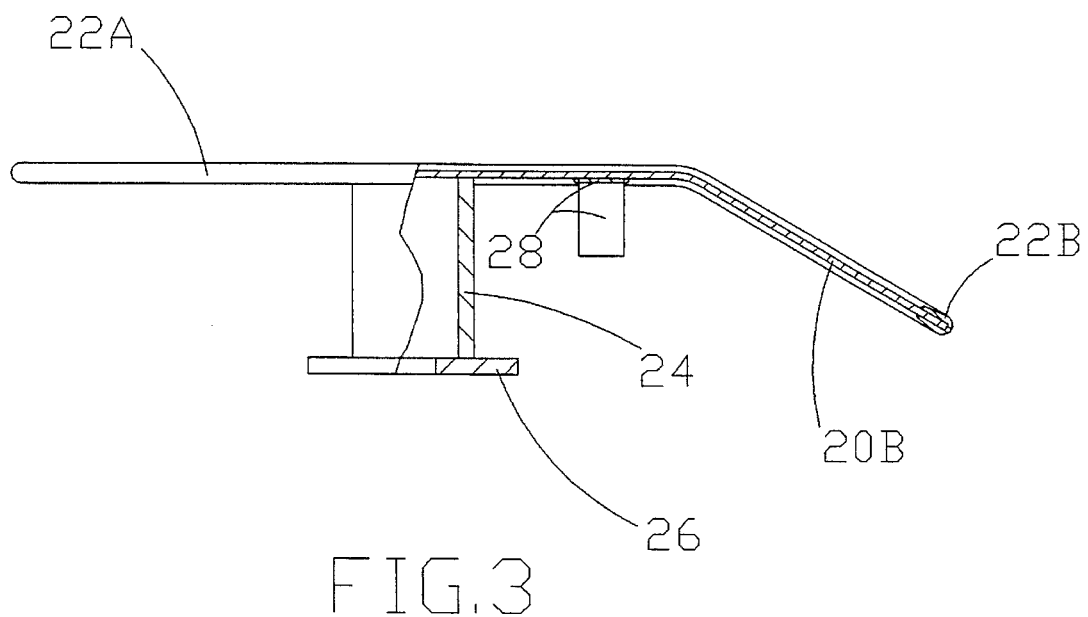
FIG. 3 is a partial cut-away view of the invention from the side.
Figures 4, 5:
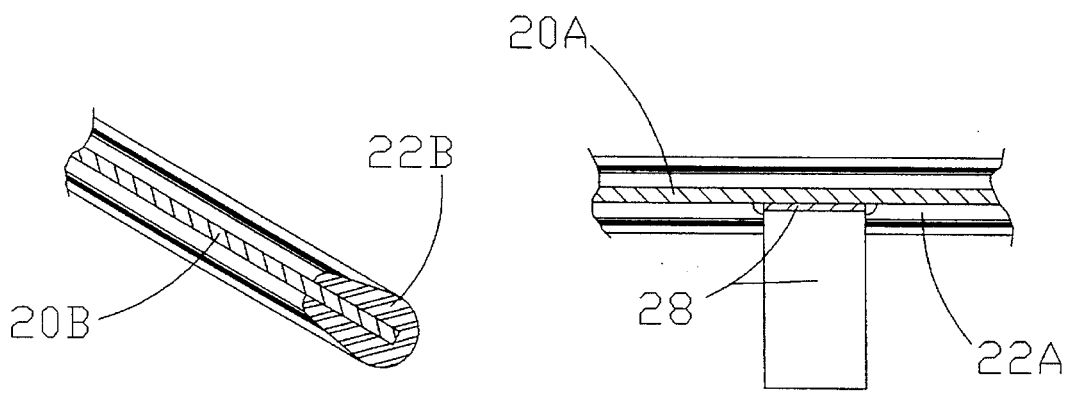
FIG. 4 is a detail view of the edge molding on the fifth wheel hitch plate cover of FIG. 1.
FIG. 5 is a detail view of the guide tab as well as the edge molding of FIG. 1.

20A—Principal portion
20B—Tail Portion
22A—Edge Molding (On edge of principal portion)
22B—Edge Molding (On edge of tail portion)
24—King Pin Shaft
26—Locking Washer
28—Guide Tab

DESCRIPTION OF THE PREFERRED EMBODIMENT

The fifth wheel hitch plate cover comprises a principal portion (20A) and a tail portion (20B) extending from the principal portion. The fifth wheel hitch plate cover is for covering the kingpin opening, the hitch plate and the sloped flanges of a fifth wheel hitch when the hitch is not in use. A king pin shaft (24) and locking washer (26) are provided for locking the fifth wheel hitch plate cover in place after the trailer has been removed from the fifth wheel hitch. The king pin guide tab (28) stabilizes the fifth wheel hitch plate cover while attached to the fifth wheel hitch plate. Moldings (22A and 22B) cover the raw edges and take up tension on the fifth wheel hitch plate.

The fifth wheel hitch plate cover is easily installed. After the fifth wheel trailer is detached, the fifth wheel hitch plate cover can be installed and locked into place. The fifth wheel hitch plate cover has a simulated king pin which is received in the kingpin opening of the hitch. The hitch's slidebar engages the kingpin of the cover. The locking washer further secures the cover via the slide bar and the guide tab prevents rotational movement of the cover when in use. To remove the hitch plate cover, the fifth wheel slide-bar is unlocked and the cover is removed. The fifth wheel trailer hitch will be ready to accept the king-pin of the fifth wheel trailer.

What is claimed is:

1. A cover for covering a motor vehicle's "fifth wheel" hitch, hitch plate and hitch plate flanges when the hitch is not in use, said cover of suitable material and thickness having a principal portion, a top side and a bottom side, one or more edges, a tail portion extending from the principal portion, said tail portion of suitable contour to cover the sloped flanges of a fifth wheel hitch plate, a simulated king pin shaft extending from the bottom side of the cover and having a free end, the king pin shaft of suitable size and shape to engage the hitch, and a locking washer for securing the engaged simulated king pin shaft to the hitch's slide bar, said locking washer integral with the free end of the king pin shaft.

2. A cover according to claim 1 wherein said cover also comprises a guide tab extending from the bottom side of the cover and positioned to bear against the sloped flanges of the fifth wheel hitch plate to further secure the cover to the fifth wheel hitch plate against rotational movement.

3. A fifth wheel hitch plate cover according to claims 1 or 2 above, wherein said hitch plate cover also comprises moldings which cover the edges of the fifth wheel hitch cover.

4. The fifth wheel hitch plate cover, according to claim 3 above, wherein the top side of said fifth wheel hitch plate cover also comprises a decorative design.

* * * * *